Figure 1:
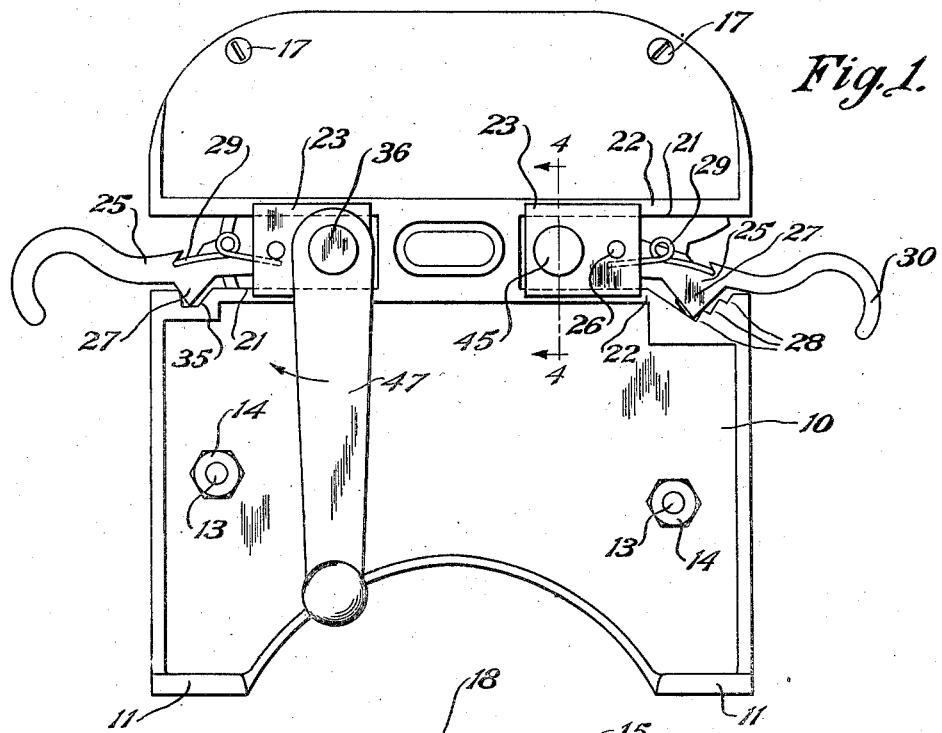

Nov. 6, 1934.  A. J. GURNEY  1,979,464
STEAK SLICING AND DICING MACHINE
Filed July 30, 1932  2 Sheets-Sheet 1

Inventor
A. J. Gurney
By Frease and Bishop
Attorneys

Nov. 6, 1934.  A. J. GURNEY  1,979,464
STEAK SLICING AND DICING MACHINE
Filed July 30, 1932   2 Sheets-Sheet 2

Inventor
A. J. Gurney
By Frease and Bishop
Attorneys

Patented Nov. 6, 1934

1,979,464

UNITED STATES PATENT OFFICE 1,979,464

STEAK SLICING AND DICING MACHINE

Albert J. Gurney, Canton, Ohio, assignor to The American Mine Door Company, Canton, Ohio, a corporation of Ohio Application July 30, 1932, Serial No. 626,274

13 Claims. (Cl. 17—26)

The invention relates to machines for slicing or dicing steaks and similar cuts of meat in order to sever the fibers and open the tissues of the meat so that the same may be made tender and juicy when broiled, fried or otherwise cooked.

The flesh of an animal is composed of tissues, and fibers which bind the tissues together, making the meat tough and hard to chew. These tissues and fibers become tougher in some parts of the meat than in others, making it practically impossible to broil or fry such cuts. Various means have been employed for making meats tender preparatory to cooking the same, such as cutting and pounding the meat. Pounding, however, crushes the tissues, opening the cells and permitting the juices to escape, causing the meat to be dry and unpalatable when cooked.

It is known that devices have been employed for cutting upon one side of a steak or the like to cut partly through the fibers and tissues thereof, but owing to the character of the cutting produced by such devices, it is necessary that the cutting knives do not pass entirely through the meat as this would result in cutting the meat into a plurality of separate thin strips. By thus cutting or slicing through only one surface of the meat pockets are formed which prevent the hot frying fats from reaching the bottom of each cut, especially if the meat is cut thick in the manner most desirable for steaks.

Another objection to such machines as have previously been used for this purpose is the difficulty of properly cleaning the same, and as these machines quickly become clogged with small particles of meat, fat and the like, it is necessary that they be frequently cleaned for sanitary reasons.

The object of the present improvement is to provide a machine which will slice through one surface of a steak or similar cut of meat at a plurality of closely spaced points and will entirely puncture the meat at intervals throughout each cut, thus perforating the bottom membrane of the meat at intervals so that the hot frying fats may pass entirely through the meat, searing the exposed cuts and quickly closing the cells of the meat so as to retain the juices and flavors therein.

Another object is to provide a steak tendering machine in which the parts may be quickly and easily removed for frequent cleaning.

A further object of the improvement is to provide means for quickly and easily adjusting the machine so as to vary the depth of the cuts in the meat.

The above and other objects may be attained by providing a machine comprising a frame or housing in which is mounted a gang of disk knives arranged to cooperate with a longitudinally corrugated or fluted roll having kerfs or notches in the high points of the corrugations to receive the cutting edges of the disk knives, means being provided for quickly and easily adjusting the cutting roll and disk knives toward or from each other and for removing the same from the housing or frame for the purpose of cleaning or repairing the machine.

Figure 2:
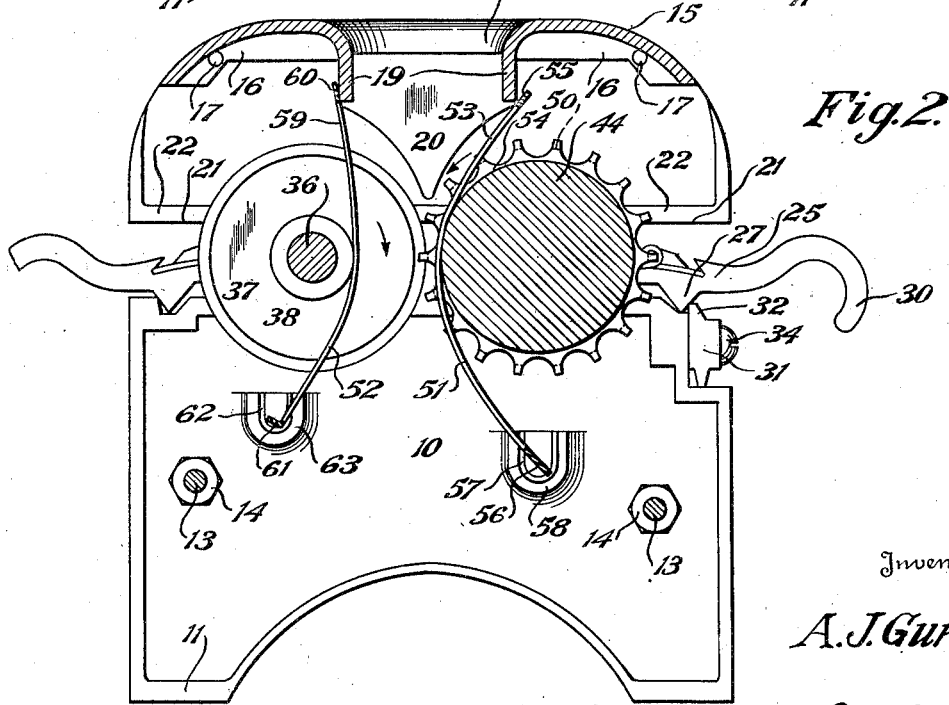
Figure 3:
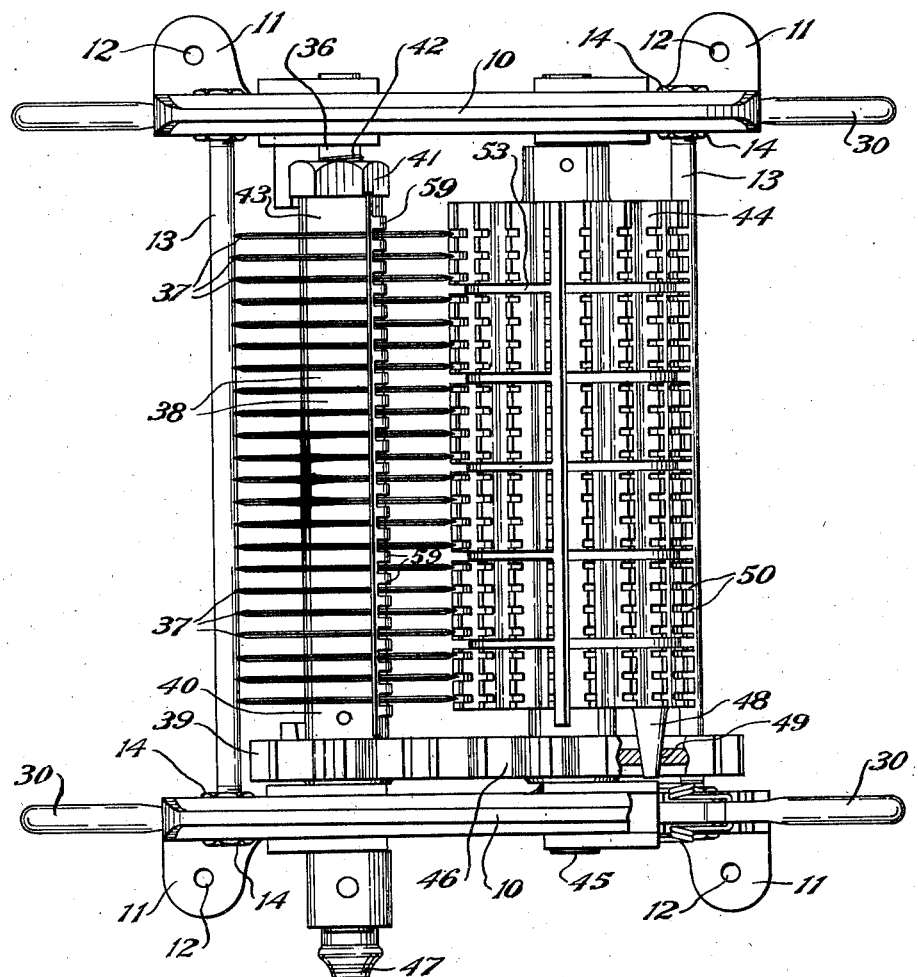
Figure 4:
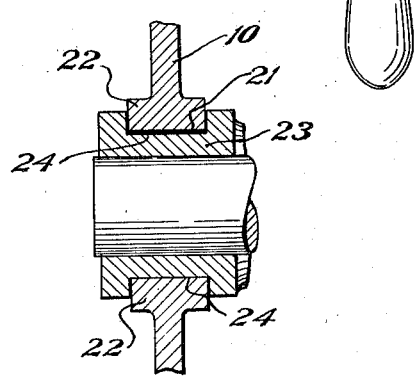

An embodiment of the invention is illustrated in the accompanying drawings, in which Figure 1 is an end elevation of the improved meat tendering machine;

Fig. 2, a transverse sectional view through the same;

Fig. 3, a top plan view of the machine with the top plate removed for the purpose of illustration; and Fig. 4, a detail sectional view on an enlarged scale taken as on the line 4—4, Fig. 1.

Similar numerals refer to similar parts throughout the drawings.

The frame or housing for the improved machine may comprise a pair of similar end members 10 provided with feet 11 which may be secured to a table, counter or the like as by screws or other fastening means which may be located through the apertures 12 therein.

These side frames may be fixed in spaced relation as by the tie rods 13 provided with screw threaded ends located through suitable apertures in the end members and having nuts 14 mounted on each side thereof.

A top plate 15 may be provided at the upper ends of the side members having the angular flanges 16 at its ends by means of which it may be fixed to the side members by screws 17 or the like. This top plate is provided through its longitudinal central portion with an opening 18 through which the cuts of meat to be sliced or diced may be inserted. Depending flanges 19 may be provided at the sides of said opening and a depending tapered flange 20, of considerably greater depth than the side flanges, may be provided at each end thereof.

Each of the side members 10 is provided with a pair of alined substantially horizontal guide slots 21, each of said slots extending from one edge to a point spaced from the vertical center of the side members and preferably reinforced by the flanges 22. A slidable bearing block 23 is mounted in each of the guide slots 21, each of said bearing blocks having grooves 24 in its upper and lower edges to slidably receive the flanged portions 22 of the guide slots 21.

For the purpose of holding the bearing blocks in adjusted position in the guide slots, a stop lever 25 is pivoted to each bearing block as at 26 and provided with a depending tooth 27. The tooth upon each stop lever at one side of the machine, namely the right-hand side as viewed in the drawings, is adapted to be selectively engaged in one of the notches 28 formed in the lower edge portion of the guide slot adjacent the outer end thereof.

A torsion spring 29 having its ends engaged in apertures in the block 23, and seated in a notch in the upper edge of the stop lever 25, may be provided for assisting gravity in urging the tooth 27 into engagement with one of the notches 28, and a curved handle portion 30 may be formed upon the outer end of each of the stop levers by means of which the same may be easily and quickly adjusted to position the corresponding bearing block at the desired point.

If desired, the adjusting means may be as shown in Fig. 2, in which the tooth 27 of each stop lever on the right side of the machine is adapted to be engaged by the adjustable block 31 provided with four differential faces 32 adapted for selective engagement with the tooth 27 of the stop lever. This block may be adjusted to locate either one of these four faces in position to contact with the tooth, after which it is fixed to the adjacent edge portion of the side member 10 as by the screw 34.

The bearing blocks 23 on the other side of the machine need not be adjusted but may be held in operative position by the tooth 27 of the corresponding stop lever engaged in a notch 35 in the lower edge portion of the corresponding guide slot 21, the springs 29 of the stop levers on this side of the machine assisting gravity in holding the teeth 27 in the notches 35 but, in the same manner as on the other side of the machine, permitting the stop levers to be easily and readily raised out of engagement with the notches when it is desired to remove the bearing blocks from the guide slots 21.

A shaft 36 is journaled in the two guide blocks upon one side of the machine and has fixed thereon a spaced plurality of disk knives 37 which are held in spaced relation upon the shaft as by the spacing collars 38. A pinion 39 is fixed upon the shaft 36, the hub 40 thereof contacting with the endmost disk knife at that end of the shaft while a nut 41 may be mounted upon the threaded portion 42 at the opposite end portion of the shaft 36 for clamping the disk knives and spacing collars between said hub and the clamping collar 43.

A longitudinally corrugated or fluted roll 44 is fixed upon the shaft 45 journaled in the bearing blocks 23 at the other side of the machine, a gear 46 being also fixed upon the shaft 45 and meshing with the pinion 39. A crank 47 may be fixed upon the shaft 36 for rotating the disk knives and corrugated roll in unison. The gear 46 may be fixed to the shaft 45 by means of a longitudinal eccentric pin or stud 48 upon the corrugated roll 44 engaging an eccentric aperture 49 in the gear. This permits the gear to be slidably removed from the shaft 45 to provide for more easily cleaning the roll when the same is removed from the machine.

In this connection it should be understood that the shafts 36 and 45 may be slidably removed from the bearing blocks 23 when the same are disconnected from the housing or frame so that the entire structure may be quickly and easily cleaned.

The ribs or high points upon the corrugated or fluted roll are provided with kerfs or notches 50 to receive the peripheral portions of the disk knives 37. For the purpose of preventing the meat from winding around the roll or knife disks, strippers 51 and 52 may be provided to cooperate with these two members. The stripper 51 comprises a plurality of curved strip portions 53 which may be positioned in peripheral grooves 54 formed in the roll 44, these strips being connected at their upper and lower ends by the crossbars 55 and 56 respectively, the lower strips having their end portions received within the U-shaped sockets 57 provided in the lugs 58 formed upon the inner sides of the side members 10 while the upper crossbar 55 is received in back of the depending flange 19 at that side of the opening 18.

The stripper 52 is formed of the spaced strip portions 59 adapted to be received between the disk knives 37 and provided at its upper and lower ends with the crossbars 60 and 61 respectively, the lower crossbar being preferably angular as shown in Fig. 2 and the ends thereof received within the U-shaped sockets 62 formed in the lugs 63 provided upon the inner sides of the end members, while the upper crossbar 60 is received in rear of the depending flange 19 upon that side of the opening 18.

In the operation of the machine to slice or dice a steak or similar cut of meat so as to cut into the fibers and tissues thereof, a cut of meat of proper width to be passed through the opening 18 of the top plate is inserted through said opening and the handle 47 is rotated in the direction of the arrow shown in Fig. 1 so as to rotate the shafts 36 and 45 in opposite directions, rotating the disk knives 37 and roll 44 toward each other as indicated by the arrows in Fig. 2, the meat being passed downward between the roll and knives which cut through the adjacent surface of the meat, at frequently spaced intervals, penetrating or puncturing entirely through the other surface of the meat as each rib or high point of the roll is encountered by the knives. The strippers 51 and 52 will prevent the steak from winding upon the roll and disk knife shaft respectively, and will guide the meat downward as it passes through the machine.

With one pass of the steak through the machine, it will be seen that the same is thus sliced upon one surface by each of the disk blades and punctured or penetrated entirely through at spaced intervals. If it is desired to dice the sliced surface of the steak, the same may be given a quarter turn and again passed through the machine, making a plurality of cuts through the sliced surface of the meat at right angles to the cuts made in the first operation and again puncturing the meat entirely through at frequently spaced intervals.

When it is desired to clean or repair the machine, it is only necessary to raise the handles 30 of the stop levers, disengaging the teeth thereon from the notches in the end members, permitting the entire assembly of bearing blocks and shaft with roll or disk knives thereon to be slidably moved outward and disengaged from the guide slots in the end members.

The bearing blocks may then be removed from the shafts and the gear 46 removed from the shaft 45, permitting these parts to be quickly and easily cleaned. The strippers may then be easily removed by swinging the upper ends thereof outward from the longitudinal center of the machine frame or housing and lifting the lower ends thereof out of engagement with the sockets in the side plates, permitting these parts as well as the frame or housing to be easily cleaned.

Although the disk knives are preferably driven in a direction opposite to that of the feeding roll 44 and at substantially twice the speed of the roll, as illustrated in the accompanying drawings, it should be understood that the relative speed of the knives and roll, as well as the manner in which they are driven, may vary without departing from the invention.

It is also pointed out that although the corrugated roll 44 is illustrated as a fluted roll comprising spaced fillets or ribs with intervening concaved grooves, the invention may be carried out by providing the roll with various other forms of corrugations.

I claim:

1. A meat tendering machine including a spaced plurality of disk knives, a corrugated roll located adjacent to the knives, there being kerfs in the high points only of said corrugated roll to receive said knives, and means for rotating said disk knives and roll to tender a slice of meat passed therebetween.

2. A meat tendering machine including a spaced plurality of disk knives, a corrugated roll located adjacent to the knives, there being kerfs in the high points only of said corrugated roll to receive said knives, and means for rotating said disk knives and roll in opposite directions to tender a slice of meat passed therebetween.

3. A meat tendering machine including a spaced plurality of disk knives, a corrugated roll located adjacent to the knives, there being kerfs in the high points only of said corrugated roll to receive said knives, means for rotating said roll, and means for rotating said knives more rapidly than the roll, to tender a slice of meat passed therebetween.

4. A meat tendering machine including a spaced plurality of disk knives, a corrugated roll located adjacent to the knives, there being kerfs in the high points only of said corrugated roll to receive said knives, means for rotating said roll, and means for rotating said knives more rapidly than the roll and in the opposite direction, to tender a slice of meat passed therebetween.

5. A meat tendering machine including a frame comprising a pair of spaced side members each having a guide slot opening through each edge thereof, a bearing block slidably mounted in each guide slot, independent means for holding each block in the corresponding slot, shafts journaled in said bearing blocks and removable endwise therefrom, and meat tendering means carried by said shafts.

6. A meat tendering machine including a frame comprising a pair of spaced side members each having a guide slot opening through each edge thereof, a bearing block slidably mounted in each guide slot, independent means for holding each block in the corresponding slot, means for holding the bearing blocks in adjusted position within the guide slots, shafts journaled in said bearing blocks and removable endwise therefrom, and meat tendering means carried by said shafts.

7. A meat tendering machine including a frame comprising a pair of spaced side members each having a guide slot opening through one edge thereof, a bearing block slidably mounted in each guide slot and removable through the end of the slot, each block having a bearing opening therein, a shaft journaled in the bearing openings of said bearing blocks and removable endwise therefrom, meat tendering means fixed upon the shaft, a detachable gear slidably mounted upon the shaft between the bearing blocks, and a driving connection between the gear and the meat tendering means.

8. A meat tendering machine including a frame comprising a pair of spaced side members each having a guide slot opening through one edge thereof, a bearing block slidably mounted in each guide slot and removable through the end of the slot, each block having a bearing opening therein, a shaft journaled in the bearing openings of said bearing blocks and removable endwise therefrom, meat tendering means fixed upon the shaft, a gear removably and rotatably mounted upon the shaft between the bearing blocks, and an eccentric stud upon the meat tendering means engaging an eccentric aperture in said gear.

9. A meat tendering machine including a frame comprising a pair of spaced side members each having a guide slot opening through one edge thereof, a bearing block slidably mounted in each guide slot, a shaft journaled in said bearing blocks and removable endwise therefrom, a stop lever upon each bearing block, and a series of notches in each side member for selective engagement by said stop lever, and meat tendering means carried by said shaft.

10. A meat tendering machine including a frame comprising a pair of spaced side members each having a guide slot opening through one edge thereof, a bearing block slidably mounted in each guide slot, a shaft journaled in said bearing blocks and removable endwise therefrom, a stop lever upon each bearing block, an adjusting block upon each side member having a series of faces for selective engagement by said stop lever, and meat tendering means carried by said shaft.

11. A meat tendering machine including a frame having a top plate provided with a central slot, a shaft journaled in the frame below said slot and provided with a spaced plurality of disk knives, a corrugated roll journaled in the frame below said slot and at one side of said disk knives, there being kerfs in the high points only of said corrugated roll to receive said knives and means for rotating said disk knives and roll to tender a slice of meat passed downward through said slot.

12. A meat tendering machine including a frame comprising a pair of spaced side members and a top plate, there being a central slot in the top plate, each of the side members having a guide slot opening through each side edge thereof, a bearing block mounted in each guide slot, independent means for holding each bearing block in the corresponding slot, shafts journaled in said bearing blocks, a spaced plurality of disk knives upon one shaft, a corrugated roll upon the other shaft, and means for rotating said disk knives and roll to tender a slice of meat passed downward through said slot.

13. A meat tendering machine including a frame comprising a pair of spaced side members each having a guide slot opening through each edge thereof, a bearing block slidably mounted in each guide slot, shafts journaled in said bearing blocks and removable endwise therefrom, a stop lever upon each bearing block, a stop in each side member adjacent to each guide slot for engagement by said stop levers, and meat tendering means carried by said shafts.

ALBERT J. GURNEY.